US005259482A

United States Patent [19]

Proulx et al.

[11] Patent Number: 5,259,482

[45] Date of Patent: Nov. 9, 1993

[54] RETRACTABLE SHUTTER FOR CONTINUOUSLY COVERING THE PIT OF A MOVABLE VEHICLE LIFT POST

[75] Inventors: Roland Proulx, St-Cuthbert; Roger Sirois; Marc Boudreault, both of Victoriaville, all of Canada

[73] Assignee: Hydro-Quebec, Montreal, Canada

[21] Appl. No.: 886,889

[22] Filed: May 22, 1992

[30] Foreign Application Priority Data

May 24, 1991 [CA] Canada ................................ 2043243

[51] Int. Cl.[5] ................................ B60S 13/00

[52] U.S. Cl. ................................ 187/8.62; 254/89 H

[58] Field of Search ................................ 187/8.62, 8.41; 254/89 H, 89 R, 93 R; 52/173 R

[56] References Cited

U.S. PATENT DOCUMENTS

| | | | |
|---|---|---|---|
| 1,167,049 | 1/1916 | Cooley et al. | 187/8.62 |
| 2,564,289 | 8/1951 | Walker | 254/89 |
| 2,655,115 | 10/1953 | Holdeman et al. | 104/32 |
| 3,106,988 | 10/1963 | Hott | 187/8.45 |
| 3,603,046 | 9/1971 | Humphrey, Jr. | 52/173 |
| 4,588,048 | 5/1986 | Rodriguez | 187/8.67 |

FOREIGN PATENT DOCUMENTS

| | | |
|---|---|---|
| 0353639 | 6/1956 | European Pat. Off. . |
| 0115087 | 12/1983 | European Pat. Off. . |
| 0155401 | 5/1984 | European Pat. Off. . |
| 2060754 | 10/1979 | United Kingdom . |

OTHER PUBLICATIONS

"Sliding Cover For Assembly Pits", Balzer.
"Op af graven til", Stenhoj, p. 4. Photograph of Stenhoj Apparatus.

*Primary Examiner*—Robert P. Olszewski
*Assistant Examiner*—Kenneth Noland
*Attorney, Agent, or Firm*—Foley & Lardner

[57] ABSTRACT

A retractable shutter for continuously covering the pit of a movable vehicle lift post which along with a fixed lift post is used to elevate vehicles of various lengths comprises two series of articulated panels positioned on one side and the other of the movable lift post at floor level in order to completely cover the pit opening. The articulated panels are horizontally guided at the opening level by horizontal guide rails mounted on the longitudinal walls of the pit and, at each end of the pit, by arcuate guide rails which then extend downwards in order to accommodate the excess of articulated panels depending on the relative position of the movable lift post along the pit. Therefore, when the movable lift post is displaced horizontally in the pit, it causes the two series of articulated panels to displace therewith, some panels emerging from the pit at one of its extremities, whereas other panels retract therein at its other extremity. Consequently, the shutter continuously covers the opening defined by the pit for every position of the movable lift post therein. The articulated panels engage the guide rails by way of carrying axials which also act as articulations between each pair of successive panels.

2 Claims, 3 Drawing Sheets

RETRACTABLE SHUTTER FOR CONTINUOUSLY COVERING THE PIT OF A MOVABLE VEHICLE LIFT POST

BACKGROUND OF THE INVENTION

1. Field of the Invention

The present invention relates to pit covers for movable vehicle lift posts and, more particularly, to a displaceable shutter which retracts in the pit at both ends thereof to continuously cover the same.

2. Description of the Prior Art

In automobile and truck maintenance garages, lift posts, mostly hydraulic, are provided for elevating the vehicle in order to allow mechanics to easily work under the vehicle. Garages intended for truck maintenance require two such vertical lift posts or jacks which are positioned under the front and rear of the truck and, more particularly, under the front and rear axles thereof. As there are trucks of various lengths, the rear lift post is fixed whereas the front lift post can be displaced horizontally towards or away from the rear jack thereby accommodating different truck wheel bases. In order to allow the horizontal displacement of the mobile lift post, a slot or pit is defined in the cement floor of the garage from which protrudes at least the front jack. The width of the pit is obviously somewhat greater than the transverse dimension of the lift post and its carrying mechanism, while the length of the pit corresponds basically to the differences in wheel bases which can be encountered in various vehicles.

The open pit on the front and rear sides of the lift post represents a safety hazard to the mechanics working on the trucks at floor level. Therefore, it is common for jack retailers to include with the mobile lift post a series of removable heavy steel plates which are positioned on each side of the jack in order to close off completely the pit. When the lift post must be horizontally displaced, a proper number of these plates must be manually removed in the direction of movement of the jack to open a passage therefor, these plates being then repositioned on the other side of the lift post to close the pit. These plates being very heavy, their handling has caused many accidents, such as workmen harming their backs or falling in the pit.

Also, these plates project above the cement floor level of the garage thereby causing the mechanics to possibly trip over them and also hampering the displacements of various devices and equipments mounted on wheels or rollers.

In order to overcome some of the above problems, installations have been proposed in which the steel plates are mounted to the lift post in order to displace therewith and thus eliminate the manual handling of the plates by the workmen. U.S. Pat. 2,564,289, issued on Aug. 14, 1951 to Walker, discloses such an installation, wherein an elongated rectangular steel plate is longitudinally mounted on each of the front and rear sides of the mobile hydraulic jack so as to extend horizontally in opposite directions therefrom over the pit. Each plate has a length which is sufficient in order to close the pit for every position of the jack therealong. More particularly, the two plates are mounted to a carriage positioned around the lift post and provided with rollers engaged in horizontal channel-shaped ways recessed into the longitudinal walls of the pit. The plates slide in rectangular recesses defined in the floor on each longitudinal side of the pit and at the front and rear thereof in order that the plates are flush with the floor. The side recesses help guide the plates in a longitudinal direction, whereas the front and rear recesses are defined to accommodate the plates which project horizontally past the pit depending on the position of the jack. At each extreme horizontal position of the jack in the pit, one of the front and rear recesses will completely receive a respective plate, with the other recess defining a depression which can cause workmen to trip or can impede the handling of equipment mounted on rollers. In the intermediate positions of the jack, the front and rear recesses will each define such a depression, albeit of smaller longitudinal dimension.

U.S. Pat. No. 3,106,988 issued on Oct. 15, 1963 to Hott, is of similar structure and operating principle, although at least two longitudinally aligned horizontal plates are disposed on each side of the lift post. Also, rollers are mounted along the longitudinal sides of the pit for supporting the plates and for reducing the friction forces as they are displaced by the jack. Furthermore, Hott does not seemingly provide recesses in the floor for accommodating the plates which thus overlie the floor and protrude continuously thereabove.

In another art, it is already known to have powered shutters to close a repair pit defined in the floor of a garage with such a repair pit acting as an alternative to the above practice of elevating the vehicle with a lift for attending to the maintenance thereof. These shutters are retractable only at one end of the pit using the principle of conventional overhead garage doors. European Patent 0 115 087, issued on Aug. 8, 1984 to Schulz, discloses a typical shutter pit closure which includes a series of successive longitudinally aligned elongated panels of transverse orientation which are articulated one to the other and which are guided along horizontal rails mounted on the longitudinal upper side edges of the pit. The shutter closure is driven by a motor located in the pit which operates a pair of sprockets each engaging a chain mounted to the underside of the panels at respective transverse ends thereof. The shutter closure is further guided downwards in the pit at one end thereof when it retracts therein upon the opening of the pit.

Also known is a shutter-like closure having the mobile lift post extending therethrough and hanging freely at both its ends into the pit. Such a closure has its articulated panels supported only by the adjacent floor edges with no guidance being provided therealong, nor in the pit.

In another aspect concerning the above fixed and mobile lift posts, it is common to have the hydraulic controls for the operation thereof (horizontally or vertically) disposed on the floor. This has occasionally resulted in the inadvertent triggering of some controls while mechanics are working underneath a vehicle.

Yet another aspect of the above described pits concerns the maintenance of the lift posts. It is standard to have the underground outer cylinder of the rear fixed lift post buried in concrete or sand, whereas the front mobile lift post is in the open in the access pit. Therefore, maintenance of the front post is possible from the access thereto in the pit. On the other hand, the rear lift post is buried remote from the pit and can thus not be attended to in the event of failure without removing the sand or breaking the concrete.

SUMMARY OF THE INVENTION

It is therefore an aim of the present invention to provide an improved closure for safely covering the pit of a movable vehicle lift post.

It is also an aim of the present invention to provide a guided shutter which is retractable at both ends of the pit.

It is a further aim of the present invention to provide a shutter comprising successive articulated panels which are joined one to the other by carrying axles adapted with rollers engaged in guide rails disposed on each longitudinal walls of the pit.

It is a still further aim of the present invention to provide a shutter which is flush with the floor, which can support heavy loads, and which is close fitted to prevent damage thereto due to objects and dust.

It is another aim of the present invention to provide a pit which allows access to both the mobile and the fixed lift posts for attending to the maintenance thereof.

It is another aim of the present invention to provide a safe control panel for the operation of the lift posts which is located remotely from the lift posts.

Therefore, in accordance with the present invention, there is provided a closure for continuously covering an opening of a chamber defined in a floor and into which is mounted a movable vehicle lift post, wherein the lift post extends upwards through the opening for elevating a vehicle with the lift post being adapted to be displaced horizontally in the chamber along the opening. The closure comprises a retractable shutter including two series of articulated panels disposed on each side of the movable lift post and attached thereto. Guide means are provided in the chamber for guiding the articulated panels horizontally along the opening in order that the panels are flush with the surrounding floor. The guide means also guide the articulated panels at the ends of the opening downwards into the chamber. Therefore, a horizontal displacement of the lift post in the chamber causes both series of articulated panels to displace therewith with some panels emerging at one end from the chamber while other panels retract in the chamber at its other end in order that the shutter continuously covers the opening for every position of the lift post in the chamber.

In accordance with the present invention, there is thus generally provided a shutter-like closure for a pit from which extends a mobile vehicle lift post. The closure which forms a floor in front and in back of the lift post is flush with the cement floor delimiting the pit. The shutter-like closure comprises a series of successive panels articulated one with the other which are supported by carrying axles provided with rollers engaged in symmetrical guide rails located on the longitudinal sidewalls of the pit.

The carrying axles asides from supporting the panels act as the articulation shaft for joining each pair of adjacent panels. Each panel is thus mounted on four rollers, two at its front end and two at its rear end, with each roller being shared by two adjacent panels. Consequently, the panels do not pivot when loads are applied thereon and follow exactly the direction of the guide rails. The guide rails define the travel of the carrying axles and allow the shutter to retract in the pit at one end thereof and to emerge therefrom at the other end of the pit.

The above shutter-like closure is activated by the displacement of the mobile lift post, thereby eliminating the manual handling of the heavy steel plates presently in use. The upper surface of the shutter is ridged in a non-skid pattern. The shutter-like closure ensures a uniform circulation area which is exempt of obstacles.

Also in accordance with the present invention, the pit further extends to the fixed lift post which, instead of being buried in sand or in concrete, is bolted to a base plate, thereby allowing easy visual access to the fixed jack in addition to the mobile jack. When it becomes necessary to replace the fixed lift post, it is only necessary to remove the bolts from the base plate, and then to tackle the lift post and proceed to its repair or replacement.

Further in accordance with the present invention, a control panel is positioned at a safe distance from the lift posts to prevent the unintentional triggering of the controls governing the operation thereof. The control panel is also positioned so that the operator thereof faces the work area defined under the vehicle near the lift posts, again for safety purposes.

Also a drain is provided in the pit to recover oil resulting from a leak.

BRIEF DESCRIPTION OF THE DRAWINGS

Having thus generally described the nature of the invention, reference will now be made to the accompanying drawings, showing by way of illustration a preferred embodiment thereof, and in which.

DESCRIPTION OF THE PREFERRED EMBODIMENTS

Figure 1:
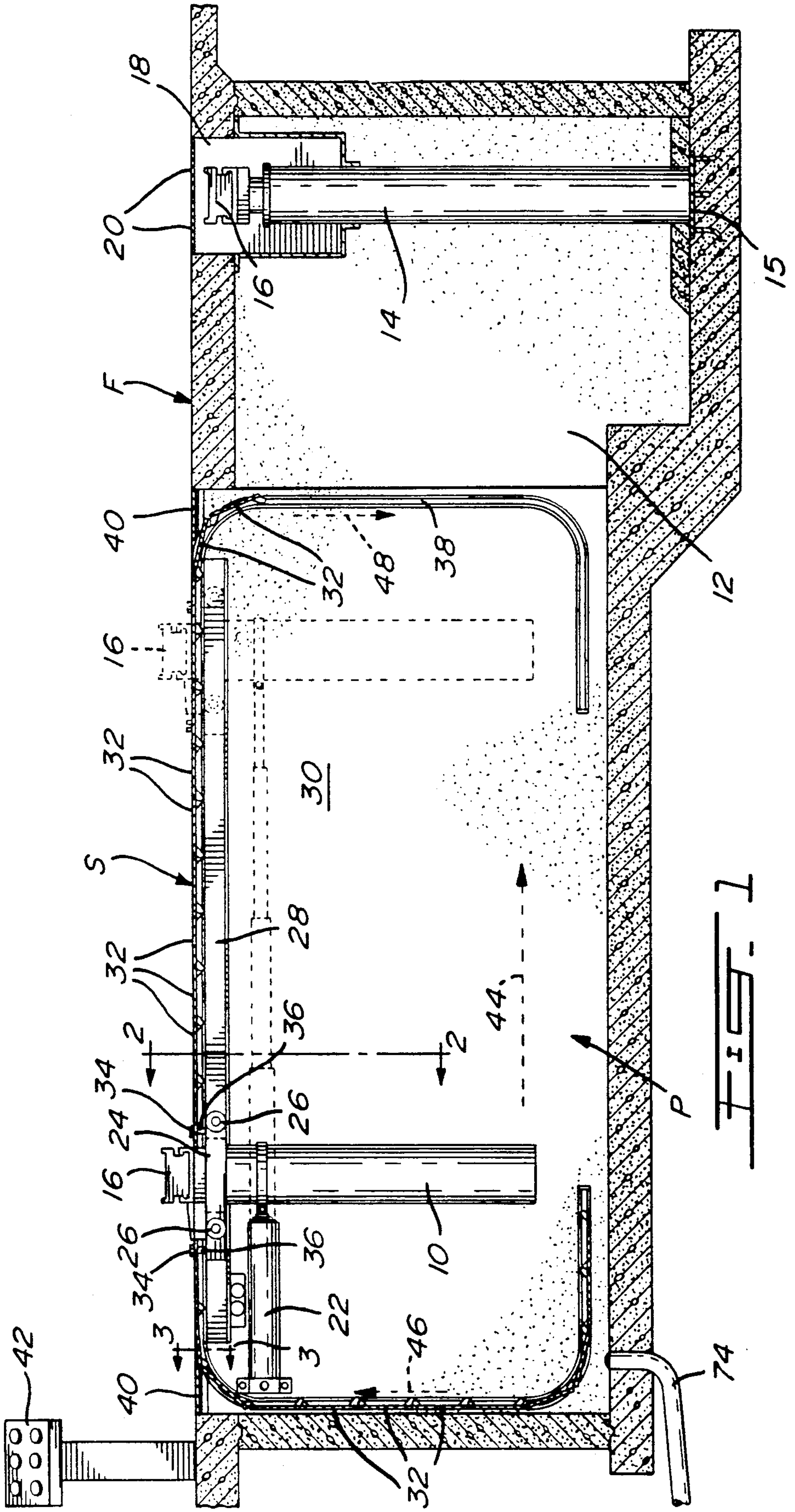
FIG. 1 is a cross-sectional longitudinal elevation of a retractable shutter covering the pit of a movable vehicle lift post in accordance with the present invention.

FIG. 1 illustrates a retractable shutter S in accordance with the present invention for closing a pit P defined in the ground of a garage for accommodating a mobile front lift post 10. The pit P communicates with an under ground chamber 12 which houses a fixed rear lift post 14. Both lift posts 10 and 14 include at their upper end a support 16 for positioning, for instance, under the axles of the vehicle to be elevated thereby. The rear lift post 14 which is bolted to the concrete by way of a base plate 15 extends upwards through an opening 18 defined in the cement floor F of the garage. The opening 18 is closed, when the rear lift post 14 is retracted in the underground chamber 12 by a pair of panels 20 pivotally mounted to the floor F which close under gravity forces, and which are caused to open under the thrust applied by the support 16 of the rear lift post 14 when the latter is raised.

The horizontal displacement of the mobile front lift post 10 along the pit P results from the actuation of a multi-section telescopic hydraulic cylinder 22, as illustrated, or by gear driven chains along a linear movement. Near the floor level, the mobile lift post 10 is fixedly mounted to a carriage 24 provided at its lateral sides with wheels 26 which are engaged in a pair of horizontal guide ways 28 embedded in the longitudinal side walls 30 of the pit P, as best seen in FIG. 2.

As generally seen in FIG. 1, the shutter S includes a series of successive articulated panels 32 positioned in front and in back of the mobile lift post 10. The first panel 32 on each side of the mobile lift post 10 is fixedly attached by way of bolts 34 and spacers 36 to the carriage 24. As it will be better described hereinafter, the articulated panels 32 are horizontally guided along the upper edges of the pit P and arcuately and then vertically guided therein at both its ends by a pair of guide rails 38 embedded in the side walls 30 of the pit P just above the guide ways 28 in which is engaged the carriage 24 of the mobile lift post 10. At each of the two points of entry of the shutter S in the pit P, there is provided a horizontal fixed end plate 40 which acts as an extension of the cement floor F.

Generally, a control panel 42 located at a safe distance from the lift posts 10 and 14 and from the vehicle elevated thereby operates the hydraulic cylinder 22 to horizontally displace the mobile lift post 10 to an appropriate position which depends on the wheel base of the vehicle to be repaired. As it displaces, the mobile lift post 10 also carries the carriage 24 and thus the shutter S which, guided by the guide rails 38, retracts in the pit P at one end thereof and emerges therefrom at its other end. For example, a displacement of the mobile lift post 10 along arrow 44 of FIG. 1 causes the upwards movement of the shutter S along arrow 46 at one end of the pit P and the downwards movement thereof along arrow 48 at the other end of the pit P. FIG. 1 shows in phantom lines the hydraulic cylinder 22 and the mobile lift post 10 at another position which is closer to the fixed lift post 14 in order to accommodate smaller vehicles or trucks. The control panel 42 also operates the vertical displacements of both lift posts 10 and 14.

Figure 2:
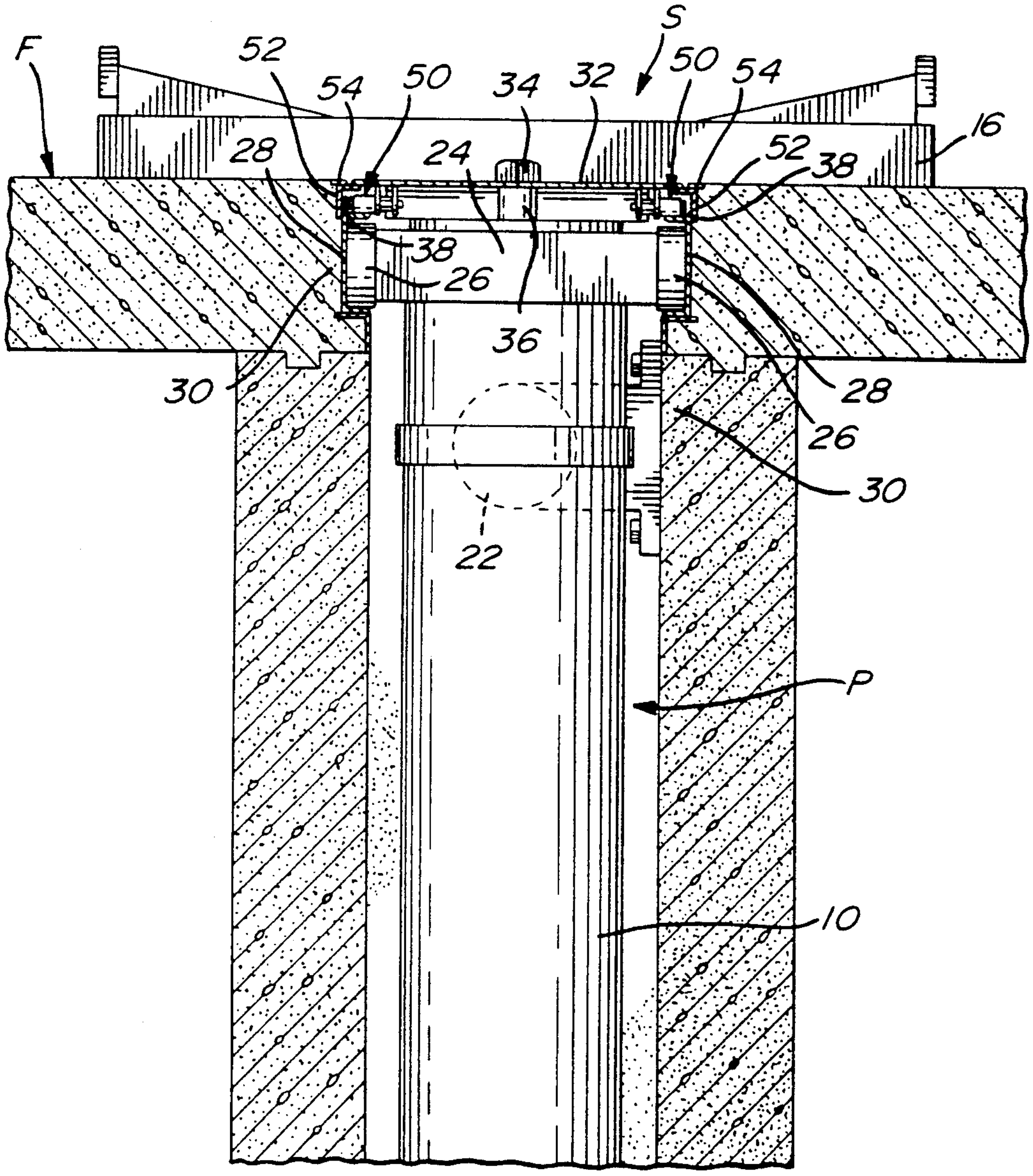
FIGS. 2 and 3 are cross-sectional side views taken respectively along lines 2—2 and 3—3 of FIG. 1 of the retractable shutter.

FIG. 2 illustrates in finer details the carriage 24 and its wheels 26 engaged in the guide ways 28 to permit the horizontal displacement of the mobile lift post 10. FIG. 2 also shows generally roller assemblies 50 which are mounted to the underside of each panel 32 and which engage the guide rails 38. The guide rails 38 are defined at their bottoms by the upper horizontal sections of the guide ways 28 and are completed by inverted L-shaped angles 52. The arcuate and vertical portions of the guide rails 38 are formed of U-shaped channels oriented sideways as the roller assemblies 50 are only supported by the upper sections of the guide ways 28 along the horizontal portion of each of the guide rails 38. Elongated steel strips 54 are embedded at floor level in the floor F to laterally guide the panels 32 of the shutter S. The roller assemblies 50 and thus the panels 32 are supported by the horizontal upper sections of the guide ways 28 along the horizontal portion of the shutter S, with the panels 32 being only supported by the upper horizontal sections of the L-shaped angles 52 when heavy loads are applied thereon or after the shutter S and, more particularly, the roller assemblies 50 are partly worn out.

Figure 3:
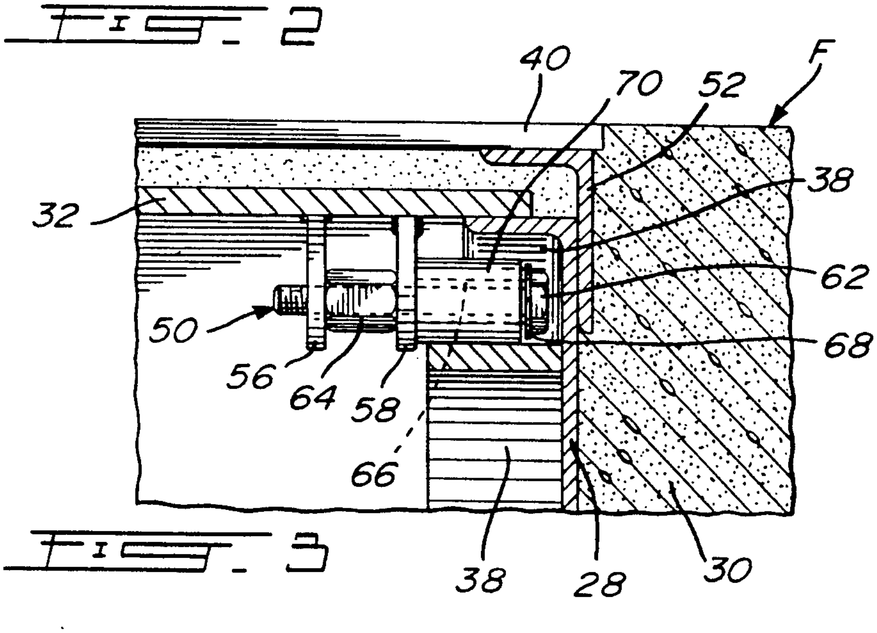
Figure 4:
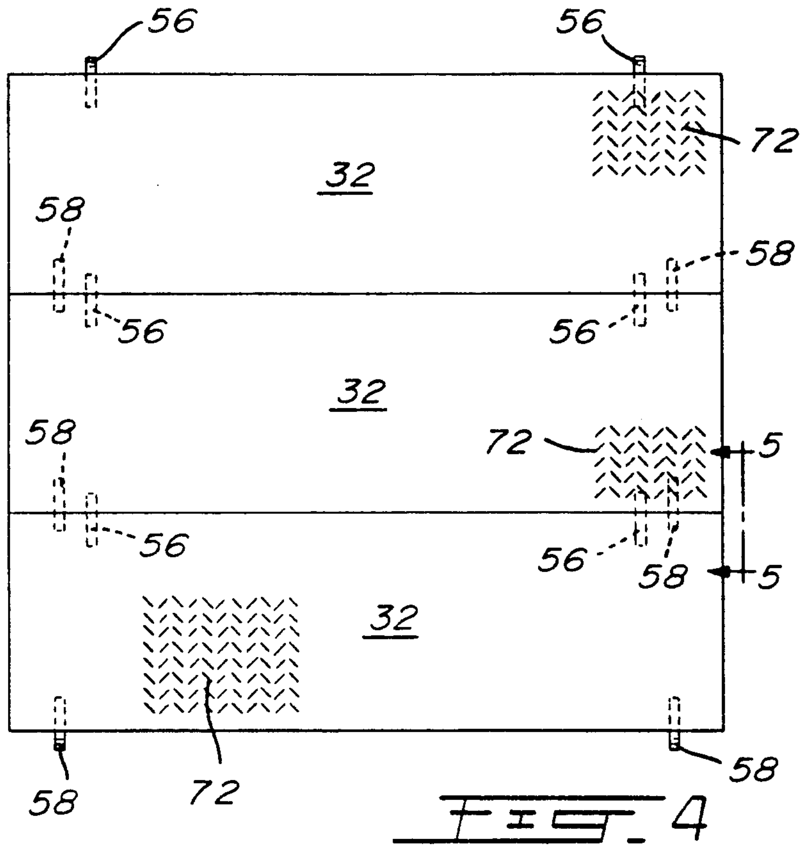
FIG. 4 is a top plan view of three of the articulated panels forming the retractable shutter.
Figure 5:
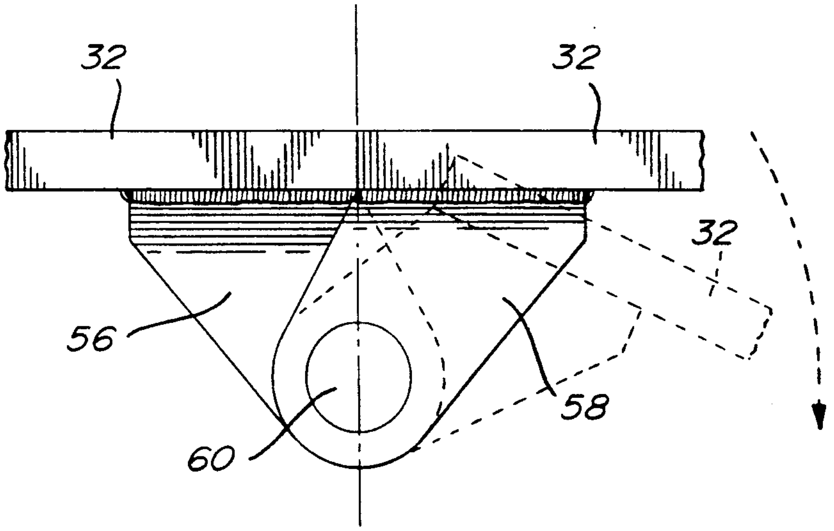
FIG. 5 is a side view taken along lines 5—5 of FIG. 4 showing a carrying axle joining a pair of successive articulated panels.

FIGS. 3 to 5 illustrate in greater details the roller assemblies 50. Each panel 32 includes two inner supports 56 and two outer supports 58 which are welded to the underside thereof near their respective transversal edges. Each support 56 and 58 defines an aperture 60 and projects downwards and outwards of the panel 32, as best seen in FIG. 5, in such a way that the aperture 60 of each inner support 56 aligns with the aperture 60 of an outer support 58 when two panels 32 are disposed longitudinally side-by-side, as seen in FIG. 4.

Now referring to FIG. 3, each roller assembly 50 includes a carrying axle which comprises a bolt 62 extending through the aligned apertures 60 of an inner support 56 and an outer support 58 with a nut 64 being provided between the inner and outer supports 56 and 58 for properly positioning the inner and outer supports 56 and 58 one with respect to the other. The carrying axle also includes a permanent lubrification bushing 66 which is fixedly jammed around the bolt 62 between the head thereof and the outer support 58, with a lock washer 68 being disposed between the head of the bolt 62 and the bushing 66. A roller 70 is rotatably mounted about the bushing 66. Therefore, the rollers 70 will roll along the guide rails 38 as the panels 32 displace longitudinally with the mobile lift post 10.

As seen in FIG. 4, the upper surface of each panel 32 defines ridges 72 forming a non-skid pattern. Also, the panels 32 are covered with an epoxy-based paint.

FIG. 5 shows in phantom lines how two successive panels 32 pivot one relative to the other when reaching the arcuate sections of the guide rails 38, such as when the panels 32 enter the pit P just before and underneath one end plate 40 (see FIG. 1). As the carrying axles act as both pivot shaft for adjacent panels 32 and axles for the rollers 70 engaged in the guide rails 38 and as these carrying axles are provided opposite the front and rear transverse edges of the panels 32, the positioning of the upper arcuate portions of the guide rails 38 under the fixed end plates 40 results in very small clearances between the shutter S and the end plates 40, thereby preventing scraps from jamming the operation of the shutter S.

As seen in FIG. 1, a drain pipe 74 is provided in the pit P to recuperate oil resulting from cylinder leaks or from spills during vehicle oil changes.

The underground chamber 12 communicates with the pit P to permit easy visual inspection of the fixed rear lift post 14. Repair of replacement of the lift post 14 is also facilitated since it is not buried in sand or concrete but rather mounted to a concrete base by the plate 15.

The control panel 42 is safe as it is located remote from the lift posts 10 and 14, and as it faces these lift posts and thus the elevated vehicle.

From the above, it is readily understood that the non-skid retractable shutter of the present invention provides a safe and easy to operate closure for the pit of a mobile lift post. It eliminates the direct handling by workmen of heavy steel plates. It is completely flush with the garage floor, thereby allowing free circulation of various equipment pieces mounted on wheels, casters or rollers. Due to its structure, dirt and small objects will not hamper the operation of the present shutter.

The panels being supported and guided at their ends by carrying axles, the shutter is solid and will not deflect even under heavy loads. Also, the panels easily follow their guide rails and stay coplanar until entering in or emerging from the pit due to the end positioning of these carrying axles, whereby no object can infiltrate and damage the structure.

The roller assemblies have the dual purpose of acting as a shaft joining adjacent panels while allowing pivots therebetweeen, and of forming carrying axles engaged in the guide rails and thus supporting the loads applied on the panels.

Other possible applications of the present retractable shutter include any openings which provide access to a chamber or a pit which has to be closed without requiring the handling of a heavy closure formed, for instance, of a series of separate steel plates.

We claim:

1. A closure for continuously covering an opening of a chamber defined in a floor and into which is mounted a movable vehicle lift post, wherein the lift post extends upwards through the opening for elevating a vehicle with the lift post being adapted to be displaced horizontally in the chamber along the opening, the closure comprising a retractable shutter including two series of articulated panels disposed on each side of the movable lift post and attached thereto, guide means provided in the chamber for guiding the articulated panels horizontally along the opening in order that the panels are flush with the surrounding floor, said guide means also guiding said articulated panels at the ends of the opening downwards into the chamber, whereby a horizontal displacement of the lift post in the chamber causes both series of articulated panels to displace therewith with some panels emerging at one end from the chamber while other panels retract in the chamber at its other end in order that said shutter continuously covers the opening for every position of the lift post in the chamber.

2. A closure as defined in claim 1, wherein each pair of adjacent articulated panels are connected one to the other at respective support means provided at adjacent ends of said adjacent panels for relative rotation of said adjacent panels one relative to the other about a pivot axis which is equidistant from both said adjacent panels, common roller means displaceable in said guide means being rotatably mounted to said support means of said adjacent ends for rotation about said pivot axis, and for supporting said adjacent panels in said guide means.

* * * * *